Patented Apr. 28, 1953

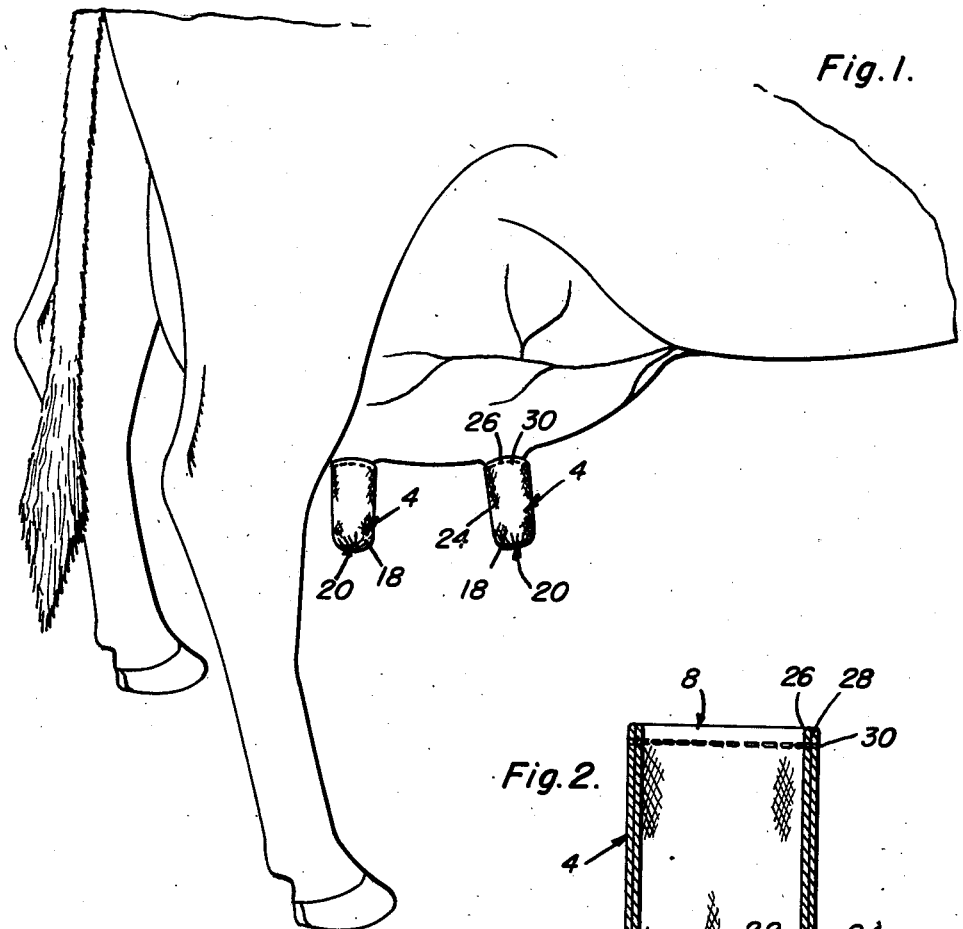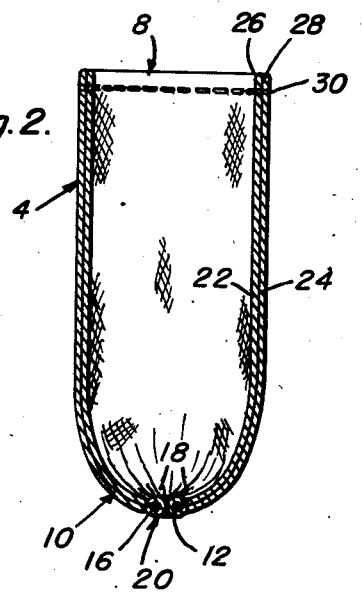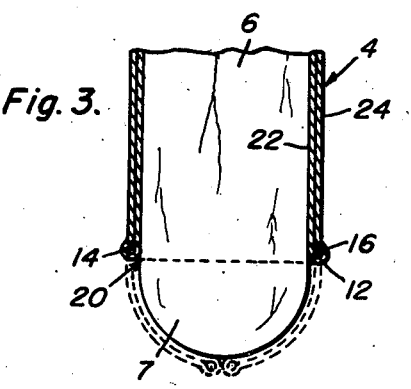

2,636,492

UNITED STATES PATENT OFFICE 2,636,492

TEAT COT

George L. Wright, Underhill, Vt.

Application January 29, 1951, Serial No. 208,249

2 Claims. (Cl. 128—157)

The present invention relates to certain new and useful improvements in cots and stalls and has more particular reference to a novelly constructed cot which is expressly adapted for use on a cow's teats, this in a manner to afford limited protection for sore and injured teats.

It has been found that a gauze or equivalent elastic fabric covering provides reliable protective media for the teats of milch cows. Such material is sometimes wrapped, more or less haphazardly in bandage fashion and taped or is in some other manner secured in place. In some instances an opening is left for milking purposes and in others it is necessary to remove the bandage from time to time. In these circumstances there has long existed a need for a simple and practical cot. It is therefore the purpose of the invention to provide an economical and practical cot construction in which manufacturers and users will find their respective requirements and needs fully met, contained and effectually available.

More specifically, novelty is predicated on the adoption and use of an elastic fabric cot which is effectively conformable to a variety of sizes of teats.

Novelty is predicated, in addition, on a cot which is seamless and therefore comforting and easy to use. Another object of the invention is to provide a teat cot which is characterized by an open-ended elastic gauze tube which is folded upon itself to provide inner and outer tubular plies, the free edge portions of the plies being stitched together and the folded portion which forms the juncture between the tubular plies defining a hem. There is an endless elastic drawstring situated and suitably fastened in the hem and this serves to gather and constrict the hem portion in a manner to provide an expansible and contractible end which is in effect a teat exposing, milking and protective cot.

Other objects and advantages will become more readily apparent from the following description and the accompanying sheet of illustrative drawings.

In the accompanying sheet of drawings wherein like numerals are employed to designate like parts throughout the views:

Figure 1 is a fragmentary perspective view of a cow showing the usual teat-equipped udder and showing, in addition, two of the improved teat cots and their method use;

Figure 2 is an enlarged central vertical section through the cot illustrating the particulars of construction; and Figure 3 is an enlarged fragmentary sectional and elevational view showing the manner in which the aforementioned protective cot opens up to allow the tip of the teat to protrude for convenient milking purposes.

Referring now to the drawings by way of reference numerals and lead lines and with particular reference to the details of construction depicted in Figure 2, it will be seen that the cot, as an article by itself, is denoted by the numeral 4. It is preferably tubular in form and is conformable in shape and size to the teat 6 on which it is mounted in the manner shown in Figure 3. The cot is adapted to completely jacket the teat and, in fact, to completely cover and conceal it in the manner shown in Figure 1. Broadly, then, said cot is a tubular construction which is open at the upper end as denoted at 8 and normally closed at the lower end, as denoted at 10. This is the so-called openable and closable protective cap. More specifically, the cot is preferably constructed from a single piece of elastic gauze. In fact the gauze is a simple open-ended tube. The gauze is then folded into halves and upon itself, as at 12 (best shown in Figure 3), where it defines a convenient hem 14. This hem serves to accommodate an endless piece of elastic 16 which is, in effect, a draw-string. The draw-string and hem coact in providing gathers 18 which, when constricted, close the access hole 20.

It may be necessary under certain conditions to tack the rubber or elastic band 16 in the hem to make sure that it will "stay put" and form the desired expansible and contractible opening or cap. By turning the halves of the material on this fold, inner and outer tubular plies 22 and 24 are provided. The free edges 26 and 28 are stitched or otherwise connected together, as at 30. This is at the open end 8, as shown at Figure 2.

It will be understood that the inherent elastic properties of the gauze used in making up the cot render the latter substantially self conforming, and a reasonable amount of stretching is allowed so that one cot of a given size will accommodate teats of varying sizes. As in most other situations, the cots will be turned out as small, medium and large and what with the expansible and contractible properties embodied, the over-all problem will be substantially met.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. A teat cot comprising an open-ended elastic gauze tube folded upon itself and providing inner and outer tubular plies, the free edge portions of said plies being stitched together and the folded end portion of said tube defining a hem, and an endless elastic draw-string mounted in said hem and gathering and constricting same and thus providing an expansible and contractible teat exposing, milking and protective cap.

2. A teat cot comprising an elastic gauze tube having a permanently open upper end for reception and accommodating passage of the teat which is to be jacketed and protected, the lower end of said tube being openable and closable and said lower end being normally closed and provided with a hem, and an endless elastic drawstring mounted in said hem and gathering and restricting the hem and thus providing an expansible and contractible teat exposing, milking and protective cap.

GEORGE L. WRIGHT.

References Cited in the file of this patent

UNITED STATES PATENTS

| Number | Name | Date |
| --- | --- | --- |
| 2,407,735 | Beckerman | Sept. 17, 1946 |
| 2,438,901 | Coxe | Apr. 6, 1948 |
| 2,522,842 | Scholl | Sept. 19, 1950 |
| 2,564,183 | Wilson | Aug. 14, 1951 |